Oct. 3, 1944.  C. PENCO  2,359,672
COMBUSTION ENGINE
Filed Nov. 3, 1943
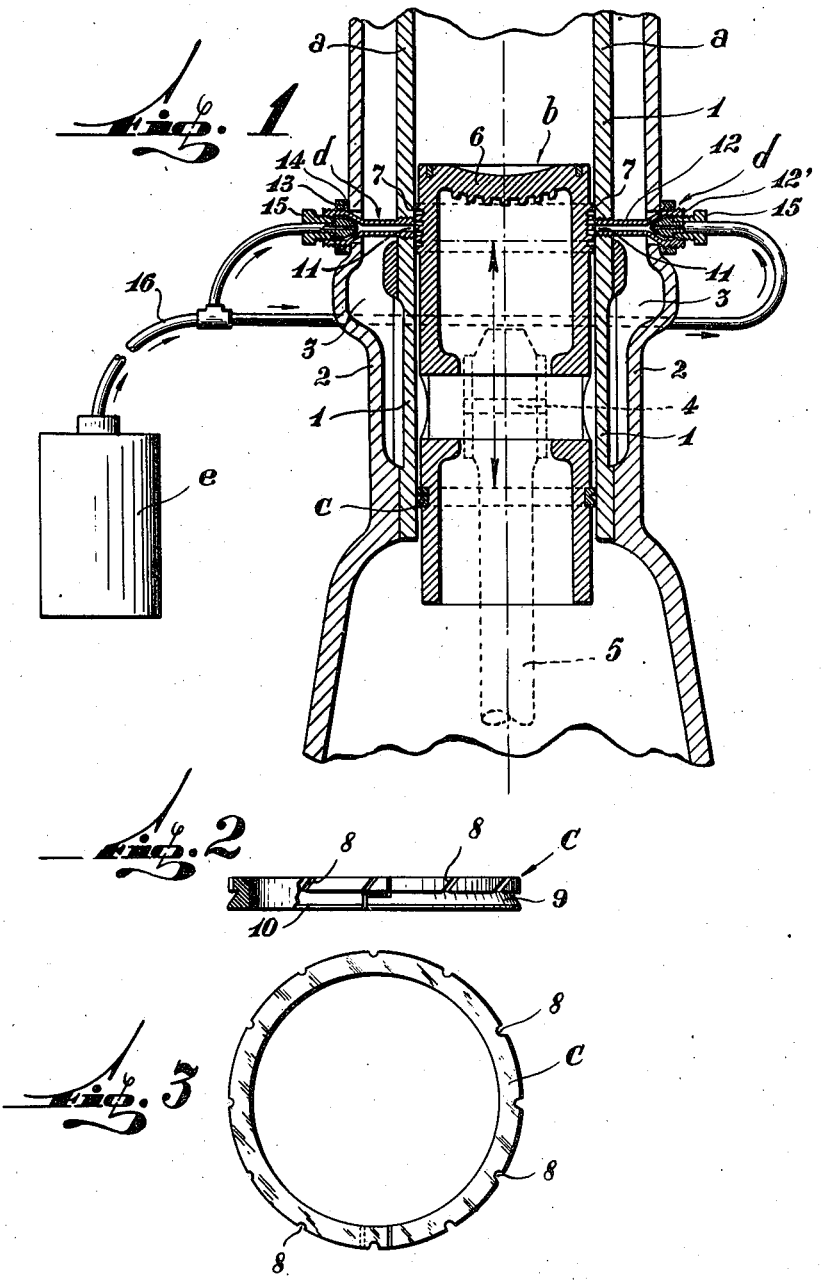
Inventor
Constantino Penco
By [signature]
Attorney Patented Oct. 3, 1944

2,359,672

UNITED STATES PATENT OFFICE 2,359,672

COMBUSTION ENGINE

Constantino Penco, Buenos Aires, Argentina

Application November 3, 1943, Serial No. 508,847
In Argentina February 3, 1943

3 Claims. (Cl. 123—176)

This invention relates to improvements in combustion engines, and particularly to means for preventing the infiltration of lubricating oil into the combustion zone.

As is well known, in the majority of the combustion engines, and particularly Diesel engines, the oil generally passes through the rings and reaches the space comprised between the cylinder head and the upper face of the piston. Since said space constitutes the combustion chamber, only the fuel substances of those co-operating therewith should have access thereto, but not the lubricating oils which are foreign agents causing serious troubles, apart from the loss of oil which in certain cases is considerable.

The invention comprises the application of a plurality of conduits starting at the outlet of a cold air force pump and leading into each one of the cylinders at a zone intermediate the stroke of the respective piston, so that in the portion comprised between the wiper and adjusting rings of said piston, they will form a surrounding air chamber due to the constant injection of air from said pump, the pressure of which is slightly higher than that at which the lubricating oil is forced. Thus, said air chambers will constitute effective blocking means to prevent the lubricating oil from reaching the combustion zone.

One of the main objects of the invention is to obtain a considerable economy in lubricating oil, with an increased yield in the work of the engine. Through actual tests, it has been found that such economy may reach figures varying between 20 and 25%, without affecting in any way the general lubrication of the engine, even in the case of aircraft engines, where the position of the engine may vary so as to correspond with the position of the plane.

A further object of the invention is to prevent the lubricating oil from infiltrating and passing to the surface of the cylinder through misadjustment of the piston pin.

A still further object is to obtain an effective auxiliary refrigeration so as to avoid overheating of the pistons and cylinder liners, by providing cold air injected at a pressure higher than that of the oil pump.

A still further object of the invention is to wipe the oil tending to pass upwardly, thus preventing same from reaching the cylinder head while at the same time keeping the piston rings in perfect working condition.

A further object of the invention is to form an air "ring" capable of serving as centering means for keeping the pistons in correct position throughout the operation thereof, thus avoiding "pitching" and consequently greatly reducing wear through friction.

Other objects and advantages of the invention will become apparent from the course of the following description, when read in conjunction with the accompanying drawing illustrating the invention by way of example and in a preferred embodiment. In said drawing:

Fig. 1 is a vertical sectional view of a combustion engine cylinder having applied thereto the air injectors connected to conductors derived from the pump outlet.

Fig. 2 is a side view of the preferred wiper ring.

Fig. 3 is a plan view of the same ring as shown in Fig. 2.

The same reference characters are used to indicate like or corresponding parts or elements in the different figures.

As may be seen from the drawing, $a$ is the cylinder comprising the liner $1$ arranged in the block $2$, the outer wall of which provides a space forming a cooling chamber $3$. Acting within said cylinder $a$ is a piston $b$ attached to a link $5$ by means of a pin $4$ and engaging the corresponding crank. As is customary, the piston shown in Fig. 1 comprises a set of compression or adjusting rings $7$, of standard type and located in the vicinity of the head $6$ thereof. The opposite portion of said piston $b$ is provided with a wiper ring $c$ having a plurality of oblique grooves $8$ leading into the annular channel $9$ ending at the side $10$, the periphery of which corresponds to the circumference of the main body of ring $c$, as shown in Figs. 2 and 3.

In accordance with the present invention, the cylinder $a$ is provided with a set of injectors $d$ the outlet orifice $11$ of which is flush with the inner surface of cylinder $a$. Said orifices $11$ are included in the zone corresponding to the middle portion of the stroke of piston $b$, that is to say, the injectors $d$ project towards the passage of piston $b$, in the plane corresponding to one-half of said stroke, so that when said piston moves downwardly as shown in full lines in Fig. 1, the orifices of said injectors will remain in front of the compression or adjusting rings $7$, while at the uppermost position of said piston $b$, the orifices $11$ will remain within the zone comprised between said ring $c$ and the upper rings $7$.

Said injectors $d$ comprise a nozzle $12$ which passes through the wall of said block $2$ and is screwed to the liner 1 of cylinder a, terminating with the orifice 11 thereof substantially flush with the inner surfaces of said cylinder, as explained above. Said nozzle 12 is provided with a cup member 12' outwardly threaded so as to receive a nut 13 serving to adjust a packing 14 against the walls of block 2. Said cup member 12' is also threaded internally so as to receive a collar 15 adapted to receive the end of a pipe 16 constituting the conduit deriving from the air source, which may be a compressor or pump, with or without an intermediary e.

Said compressor e produces an air feed through pipe 16, said air passing to injectors d and discharging through orifices 11 into the space between each piston b and each cylinder a. This is done through the motion of the engine since, as mentioned hereinbefore, the position of the injectors is such that during its stroke said piston will continuously receive air in the zone comprised between the upper rings 7 and the lower ring c.

Due to the relative air-tightness of said rings, the space between the piston and the cylinder will provide a surrounding air chamber the pressure of which will be substantially stable due to the fact that the losses through misadjustment of the rings will be compensated by the air provided by means of said compressor e.

Said pressure should be calculated so as to be slightly higher than the pressure of the oil forced by the corresponding lubricating pump, whereby the air will prevail relative to the lubricating oil. Thus, the surface of the piston and/or cylinder will only receive sufficient lubricating oil to facilitate the operation of the piston, and any excess of said lubricating oil will be wiped by the pressure of air which will thus constitute an effective blocking means for said excess oil.

This results in a considerable economy in the consumption of oil, without affecting the lubrication itself and with the additional advantage that it will not produce slag in the explosion head, since said blocking air will prevent the passage of oil to said head. Furthermore, said surrounding air chamber will also serve to center the piston and reduce the wear thereof, and also will provide an effective cooling means to prevent overheating of both the cylinder and the piston.

In the operation, the air will act in combination with the ring c. Due to the grooves 8 provided in said ring, upon leaving the blocking chamber, said air will follow a helicoidal path and after forming a mixture in the annular channel 9, will leave through the space between the side 10 and the inner surface of the cylinder, so that the exhausting of the air takes place in a wiping fashion.

Summarizing, the invention comprises a set of injectors applied to the cylinders and connected to an air compressor so that through the action thereof and at a pressure slightly higher than that of the lubricating oil, air will be injected into the space between the piston rings and the inner surface of the cylinder, thus forming a permanent chamber of compressed air capable of preventing the passage of oil to the head thereof.

It is evident that in carrying the invention into practice, several changes and modifications in the construction and details will occur to those skilled in the art, without departing from the scope of the invention as clearly set forth in the appended claims.

I claim:

1. Improvements in combustion engines of the type comprising a set of rings located in the vicinity of the head of each piston and further oppositely located ring means, wherein the cylinder in which said piston acts is provided with a plurality of injectors coupled to conduits from an air compressor and leading into said cylinder, said injectors having outlet orifices located in a zone intermediate the stroke of said piston, said outlet orifices terminating in front of said piston, in the space between said set of rings and said oppositely located ring means, said oppositely located ring means being obliquely grooved, said grooves constituting the outlet of a chamber formed between said piston and said cylinder and receiving the air injectors.

2. Improvements in combustion engines of the type comprising a set of rings located in the vicinity of the head of each piston and further oppositely located ring means, wherein the cylinder in which said piston acts is provided with a plurality of injectors coupled to conduits from an air compressor and leading into said cylinder, said injectors having outlet orifices located in a zone intermediate the stroke of said piston, said outlet orifices terminating in front of said piston, in the space between said set of rings and said oppositely located ring means, said oppositely located ring means being obliquely grooved, said grooves constituting the outlet of a chamber formed between said piston and said cylinder and receiving the air injectors, said injectors passing through the wall and through the liner constituting the cylinder proper and terminating with orifices flush with the inner surface of said cylinder, said compressor having coupling means and suitably branched connecting conduits deriving from said air compressor.

3. Improvements in combustion engines of the type comprising a set of rings located in the vicinity of the head of each piston and further oppositely located ring means, wherein the cylinder in which said piston acts is provided with a plurality of injectors coupled to conduits from an air compressor and leading into said cylinder, said injectors having outlet orifices located in a zone intermediate the stroke of said piston, said outlet orifices terminating in front of said piston, in the space between said set of rings and said oppositely located ring means, said oppositely located ring means being obliquely grooved, said grooves constituting the outlet of a chamber formed between said piston and said cylinder and receiving the air injectors, said injectors passing through the wall and through the liner constituting the cylinder proper and terminating with orifices flush with the inner surface of said cylinder, said compressor having coupling means and suitably branched connecting conduits deriving from said air compressor, the pressure of said air being slightly higher than that of the lubricating oil.

CONSTANTINO PENCO.